US010154334B1

(12) United States Patent
Lin et al.

(10) Patent No.: US 10,154,334 B1
(45) Date of Patent: Dec. 11, 2018

(54) SPORTS HI-FI TOUCH-CONTROL BLUETOOTH EARPHONE

(71) Applicant: Kingstate Electronics (Dongguan) Co., Ltd, Dong Guan (CN)

(72) Inventors: Shun-Peng Lin, Dong Guan (CN); Szu-Ming Yin, Dong Guan (CN); Ting-Wei Lee, Dong Guan (CN); Yi-Jen Chang, Dong Guan (CN)

(73) Assignee: KINGSTATE ELECTRONICS (DONGGUAN) CO., LTD, Dong Guan, Guangdong Province (CN)

( * ) Notice: Subject to any disclaimer, the term of this patent is extended or adjusted under 35 U.S.C. 154(b) by 0 days.

(21) Appl. No.: 15/865,185

(22) Filed: Jan. 8, 2018

(30) Foreign Application Priority Data

Nov. 10, 2017 (CN) .......................... 2017 1 1101925

(51) Int. Cl.

| | |
|---|---|
| ***H04R 1/10*** | (2006.01) |
| ***G06F 3/044*** | (2006.01) |
| ***H04R 19/04*** | (2006.01) |
| *H04R 25/00* | (2006.01) |
| *H04R 3/04* | (2006.01) |

(52) U.S. Cl.

CPC ........... *H04R 1/1041* (2013.01); *G06F 3/044* (2013.01); *H04R 1/105* (2013.01); *H04R 1/1016* (2013.01); *H04R 1/1025* (2013.01); *H04R 1/1075* (2013.01); *H04R 19/04* (2013.01); *H04R 3/04* (2013.01); *H04R 2201/003* (2013.01); *H04R 2420/07* (2013.01)

(58) Field of Classification Search

CPC .. H04R 1/1041; H04R 1/1016; H04R 1/1025; H04R 1/105; H04R 1/1075; H04R 19/04; G06F 3/044

USPC ......................... 381/74; 455/315, 350, 575.1

See application file for complete search history.

(56) References Cited

U.S. PATENT DOCUMENTS

2012/0127124 A1* 5/2012 Zanone ................. G06F 1/3231 345/174

2012/0237046 A1* 9/2012 Yamkovoy ............. H04R 5/033 381/59

(Continued)

*Primary Examiner* — Vivian Chin
*Assistant Examiner* — Ammar Hamid
(74) *Attorney, Agent, or Firm* — Ming Chow; Sinorica, LLC

(57) ABSTRACT

A sports Hi-Fi touch-control Bluetooth earphone includes a neckband, a first case and a second case connected to both ends of the neckband, an earplug set on each of the first and second cases, a Bluetooth main circuit board, a battery, a main microphone, an auxiliary microphone, and a capacitive touchpad. The main microphone and the auxiliary microphone simultaneously receive audio signals. The differential amplifier of the Bluetooth main circuit board computes the signal difference between the main microphone and the auxiliary microphone. The signal difference is further processed by a band-pass filter to pass only the human voice frequency band, with low and high frequency signals filtered out. The human voices are amplified to produce clear conversations, enhancing conversation quality and avoiding unclear signals. Mechanical keys on conventional Bluetooth earphones are replaced by the capacitive touchpad, making operations easy, convenient, waterproof, and dustproof to extend the lifetime thereof.

7 Claims, 8 Drawing Sheets

(56) References Cited

U.S. PATENT DOCUMENTS

| | | | | |
|---|---|---|---|---|
| 2013/0343564 | A1* | 12/2013 | Darlington | H04R 1/1016<br>381/74 |
| 2015/0230019 | A1* | 8/2015 | Sakai | H04R 1/1041<br>381/74 |
| 2018/0090816 | A1* | 3/2018 | Mow | H01Q 1/243 |

* cited by examiner

SPORTS HI-FI TOUCH-CONTROL BLUETOOTH EARPHONE

FIELD OF THE INVENTION

The invention relates to earphones and, in particular, to a sports Hi-Fi touch-control Bluetooth earphone and the working principles thereof.

BACKGROUND OF THE INVENTION

With the continuous improvement of living standards, work pressure also increases. Bluetooth earphones have provided convenience to people in business, entertainment, travel, and exercises. Bluetooth earphones takes the advantage of the Bluetooth technology on hands-free earphones. Users can get away with annoying cables, and enjoy relaxed and easy phone calls or music. Since the advent of Bluetooth earphones, they have been serving people in mobile business, entertainment, evening jogs, and tourists.

However, current Bluetooth earphones are all designed with the structure of mechanical keys. When the user commutes, jogs, rides a bicycle, or travels, the earphone may encounter rain, heavy sweat or other liquids. Such liquids can enter the case via the gaps of the mechanical keys or switches, causing damages to the circuit. Moreover, existing Bluetooth earphones have microphones on or near the Bluetooth motherboard, and are slightly far away from the calling position (user's mouth). As a result, the received voice signal of the speaker (user's voice) is very small. If the environment around the user is very noisy (such as on a subway, in a station lobby, on a bus, on a roadside, etc.), the ambient sound is often lauder or just slightly smaller than the sound of the user. In such cases, the other party cannot hear clearly the voices of the user.

SUMMARY OF THE INVENTION

In view of the foregoing, an objective of the invention is to provide a sports Hi-Fi touch-control Bluetooth earphone that has an ingenious design, a reasonable structure, touch-control functions, waterproof effects, and high voice quality.

To achieve the above-mentioned objective, the disclosed sports Hi-Fi touch-control Bluetooth earphone includes a neckband, a first case and a second case on both ends of the neckband, an earplug set disposed on each of the first and second cases, a Bluetooth main circuit board, a battery, a main microphone, an auxiliary microphone, and a capacitive touchpad. The auxiliary microphone is disposed at the central position of the neckband via a fixing case. The battery is disposed inside the first case. The inner surface of the front wall of the second case is recessed so that the thickness of the front wall becomes thinner and forms a touch part. The capacitive touchpad is disposed on the touch part. The Bluetooth main circuit board is disposed inside the second case. The main microphone is disposed on the Bluetooth main circuit board. The Bluetooth main circuit board is connected to the main microphone, the auxiliary microphone, the capacitive touchpad and the battery.

In an embodiment of the invention, the capacitive touchpad includes a touch-control substrate and a plurality of metal plates evenly spaced at the central position of the touch-control substrate, and the periphery of the touch-control substrate is provided with a ground plate extended along the profile line thereof.

In an embodiment of the invention, the touch-control substrate has a circular profile, each of the metal plates has a sector profile, and the four metal plates are disposed on the touch-control substrate in a symmetric way with respect to the center.

In an embodiment of the invention, the thickness of the touch part is smaller than or equal to 0.5 mm.

In an embodiment of the invention, the main microphone is a MEMS microphone.

In an embodiment of the invention, the auxiliary microphone is a MEMS microphone.

In an embodiment of the invention, the first case includes a first front cover and a corresponding first rear cover provided with a first hook, and the first front cover is formed with a first engaging slot corresponding to the first hook. A side position of the first rear cover is provided with an ear hook, and the other side position thereof is provided with a first arc hole and a first positioning circular hole. The earplug set includes an ear cavity case, a speaker disposed inside the ear cavity case, and a silicon earplug disposed on a sidewall of the ear cavity case. The other sidewall of the ear cavity case is provided with a first pin corresponding to the first arc hole and a first positioning pole corresponding to the first positioning circular hole.

In an embodiment of the invention, the second case includes a second front cover and a corresponding second rear cover provided with a second hook, and the second front cover is formed with a second engaging slot corresponding to the second hook. A side position of the second rear cover is provided with an ear hook, and the other side position thereof is provided with a second arc hole and a second positioning circular hole. The earplug set includes an ear cavity case, a speaker disposed inside the ear cavity case, and a silicon earplug disposed on a sidewall of the ear cavity case. The other sidewall of the ear cavity case is provided with a second pin corresponding to the second arc hole and a second positioning pole corresponding to the second positioning circular hole.

The invention achieves the following effects. The disclosed structure is ingenious and reasonable. Both the main microphone and the auxiliary microphone take the voice signals simultaneously. The differential amplifier of the Bluetooth main circuit board computes the signal difference between the main microphone and the auxiliary microphone. The signal difference is processed by a band-pass filter to only pass human voice frequency band while filtering out high and low frequencies. The human voices are amplified to produce clear conversations. This greatly increases the conversation quality, and avoid the problem of unclear signals of sports Bluetooth earphones in the prior art. Besides, the mechanical keys on conventional Bluetooth earphones are replaced by the capacitive touchpad. The user can perform various functions by touching the case with fingers, such as playing, pausing, playing the next song, and playing the previous song. The operations are simple and convenient. As the capacitive touchpad is an internal structure, the sealing effect is sufficient good to prevent external liquids and objects, achieving good waterproof and dust-proof effects. Therefore, the lifetime of the product can be effectively extended. Moreover, the entire structure is compact so that its size is small and its weight is light. It has a beautiful appearance and is highly portable, bringing convenience to human work and life.

DESCRIPTION OF THE PREFERRED EMBODIMENTS

Figure 1:
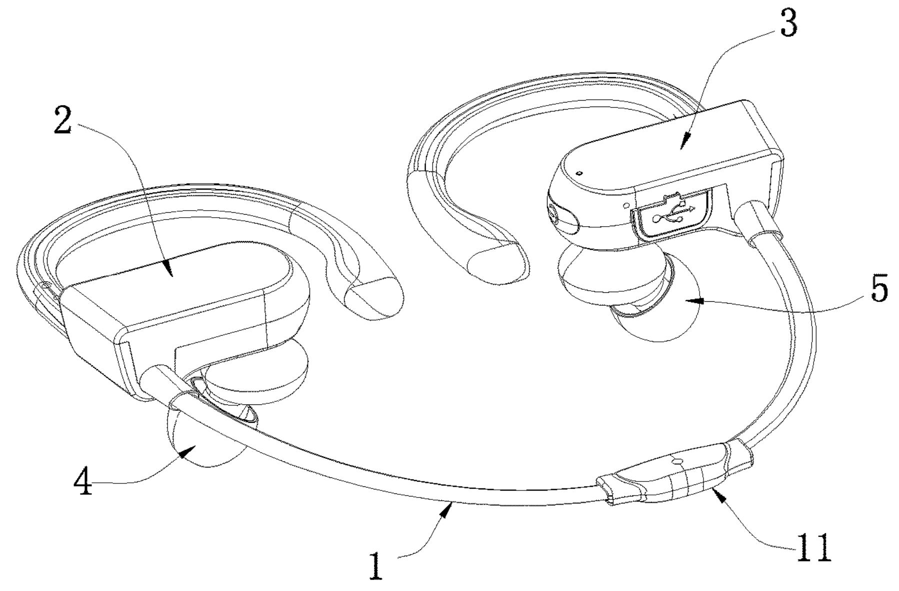
FIG. 1 is a schematic three-dimensional view of the invention.
Figure 2:
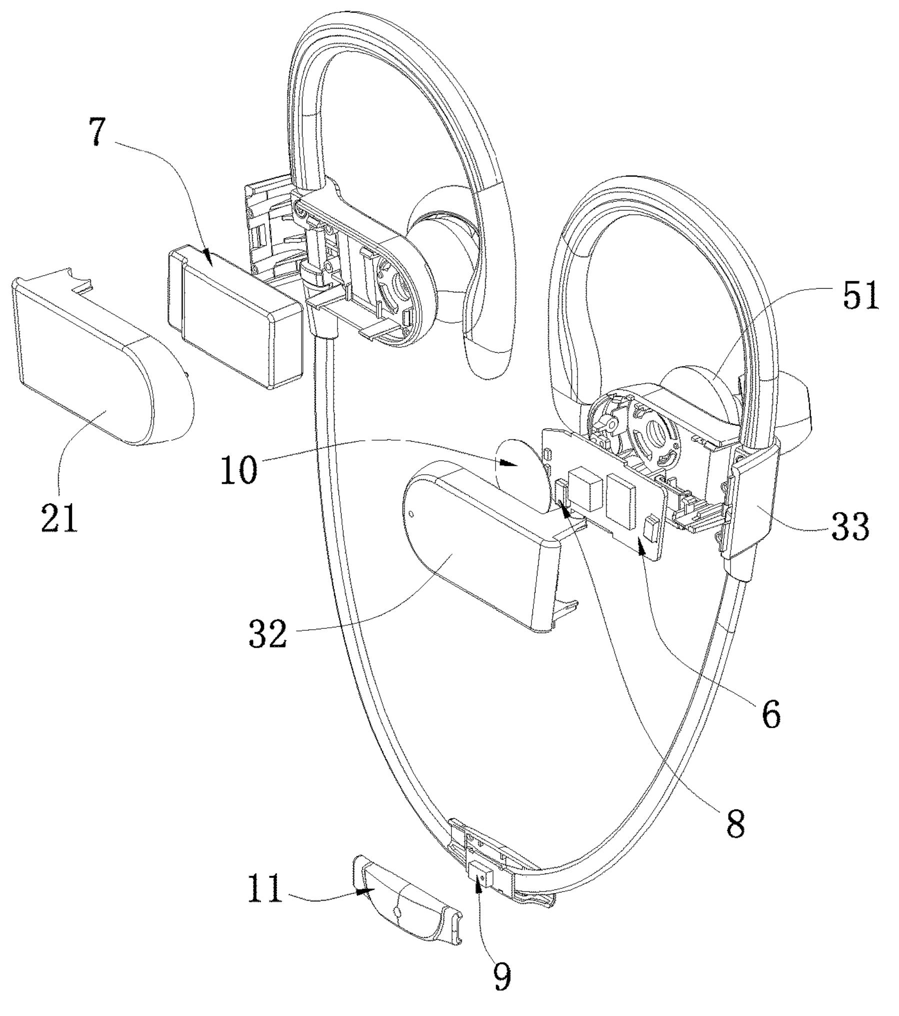
FIG. 2 is an exploded view of the invention.

The aforementioned and other objectives and advantages of this disclosure will become clearer in light of the following detailed description of an illustrative embodiment of this invention described in connection with the drawings.

Please refer to FIGS. 1 to 8 for an embodiment of the invention. The disclosed sports Hi-Fi touch-control Bluetooth earphone includes a neckband 1, a first case 2 and a second case 3 on both ends of the neckband 1, an earplug set 4 disposed on the first case 2, an earplug set 5 disposed on the first case 3, a Bluetooth main circuit board 6, a battery 7, a main microphone 8, an auxiliary microphone 9, and a capacitive touchpad 10. The auxiliary microphone 9 is disposed at the central position of the neckband 1 via a fixing case 11. The battery 7 is disposed inside the first case 2. The inner surface of the front wall of the second case 3 is recessed so that the thickness of the front wall becomes thinner and forms a touch part 31. The capacitive touchpad 10 is disposed on the touch part 31. The thickness of the touch part 31 is preferably smaller than or equal to 0.5 mm to ensure the stability of the sensitivity thereof. The mechanical keys on conventional Bluetooth earphones are replaced by the capacitive touchpad 10. The user can perform various functions by touching the case with fingers, such as playing, pausing, playing the next song, and playing the previous song. The operations are simple and convenient. As the capacitive touchpad 10 is an internal structure, the sealing effect is sufficient good to prevent external liquids and objects, achieving good waterproof and dust-proof effects. Therefore, the lifetime of the product can be effectively extended.

The Bluetooth main circuit board 6 is disposed inside the second case 3. The main microphone 8 is disposed on the Bluetooth main circuit board 6. The Bluetooth main circuit board 6 is connected to the main microphone 8, the auxiliary microphone 9, the capacitive touchpad 10 and the battery 7.

Figure 5:
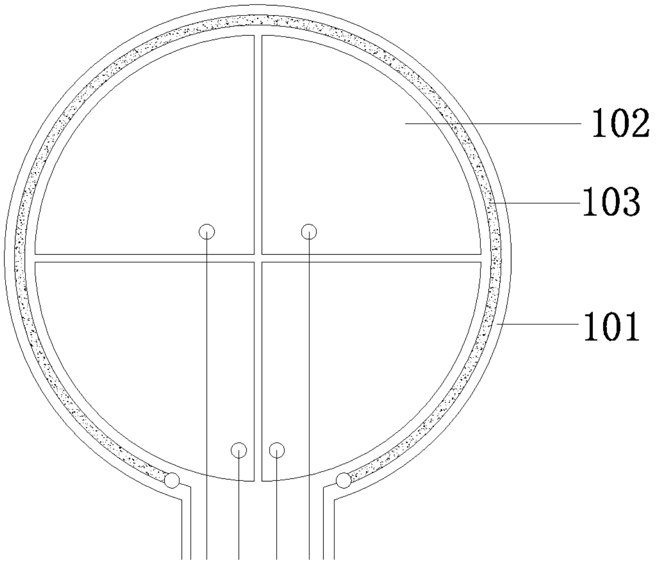
FIG. 5 is a schematic view of the capacitive touchpad in the invention.

As shown in FIG. 5, the capacitive touchpad 10 includes a touch-control substrate 101 and a plurality of metal plates 102 evenly spaced at the central position of the touch-control substrate 101. The periphery of the touch-control substrate 101 is provided with a ground plate 103 extended along the profile line thereof. Covering the periphery of the touch-control substrate 101 with the ground plate 103 can effectively prevent external noise interference and greatly increase the touch-control accuracy. Preferably, the touch-control substrate 101 has a circular profile, each of the metal plates 102 has a sector profile, and the four metal plates 102 are disposed on the touch-control substrate 101 in a symmetric way with respect to the center. In this embodiment, the touch-control substrate 101 has a circular profile, each of the metal plates 102 has a sector profile, and the four metal plates 102 are disposed on the touch-control substrate 101 in a symmetric way with respect to the center. They form a circular metal plate 102 with a cross-shaped gap. The diameter of the circular metal plate 102 is greater than or equal to 5 mm to effectively reduce erroneous touch-control actions. In other embodiments, the profile of the touch-control substrate 101 has a shape according to the case, such as elliptical or square.

In an embodiment of the invention, the main microphone 8 is a MEMS microphone. It is located closer to the user's mouth to have a better voice signal taking effect. At the same time, it occupies a smaller space to achieve miniaturization. The auxiliary microphone 9 is preferably a MEMS microphone to also minimize the volume.

Figure 3:
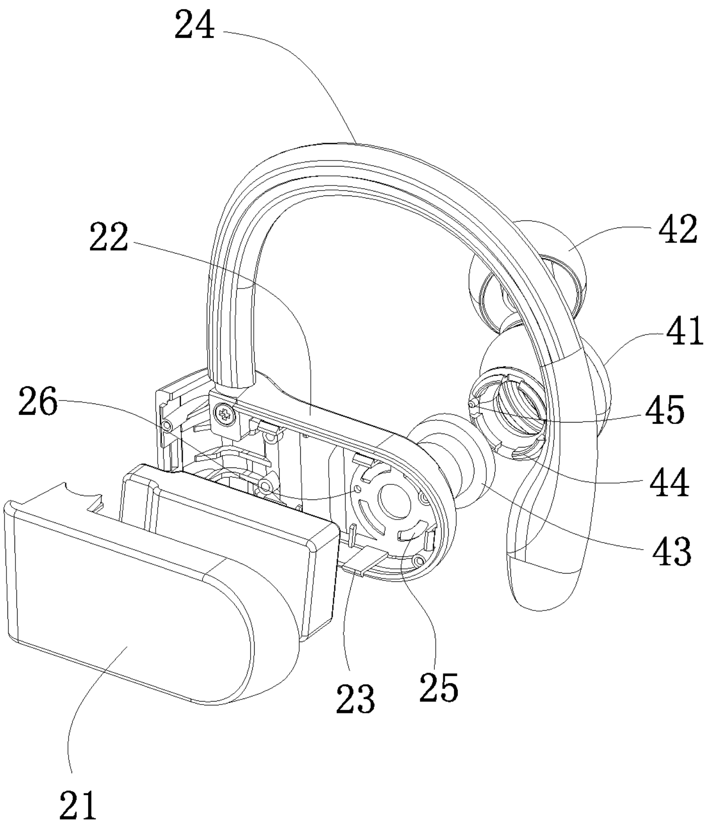
FIG. 3 is an exploded view of the first case in the invention.

With reference to FIG. 3, the first case 2 includes a first front cover 21 and a corresponding first rear cover 22 provided with a first hook 23, and the first front cover 21 is formed with a first engaging slot corresponding to the first hook 23. A side position of the first rear cover 22 is provided with an ear hook 24, and the other side position thereof is provided with a first arc hole 25 and a first positioning circular hole 26. The earplug set 4 includes an ear cavity case 41, a speaker 43 disposed inside the ear cavity case 41, and a silicon earplug 42 disposed on a sidewall of the ear cavity case 41. The other sidewall of the ear cavity case 41 is provided with a first pin 44 corresponding to the first arc hole 25 and a first positioning pole 45 corresponding to the first positioning circular hole 26.

Figure 4:
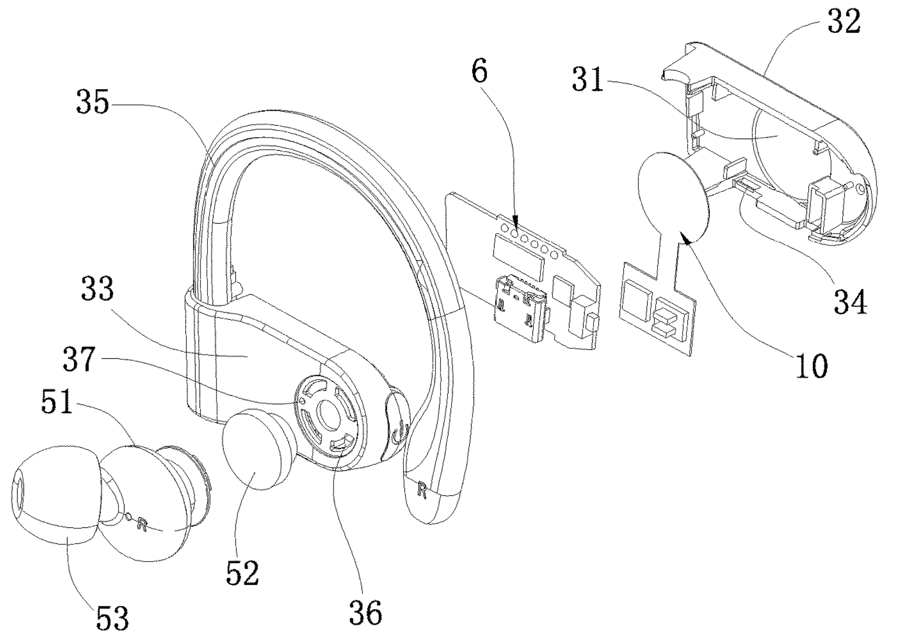
FIG. 4 is an exploded view of the second case in the invention.

With reference to FIG. 4, the second case 3 includes a second front cover 32 and a corresponding second rear cover 33 provided with a second hook, and the second front cover 32 is formed with a second engaging slot 34 corresponding to the second hook. A side position of the second rear cover 33 is provided with an ear hook 35, and the other side position thereof is provided with a second arc hole 36 and a second positioning circular hole 37. The earplug set 5 includes an ear cavity case 51, a speaker 52 disposed inside the ear cavity case 51, and a silicon earplug 53 disposed on a sidewall of the ear cavity case 51. The other sidewall of the ear cavity case 51 is provided with a second pin corresponding to the second arc hole 36 and a second positioning pole corresponding to the second positioning circular hole 37.

Figure 6:
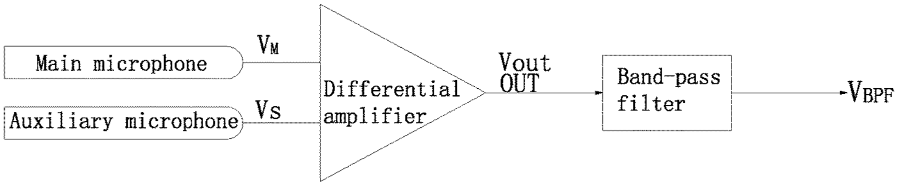
FIG. 6 shows the working principles of filtering out the noises according to the invention.

During the operation, both the main microphone 8 and the auxiliary microphone 9 receive voices simultaneously. The differential amplifier of the Bluetooth main circuit board 6 computes the signal difference between the main microphone 8 and the auxiliary microphone 9. The signal difference further passes a band-pass filter (200~4000 Hz) to pass only human voice frequency band, filtering out signals of low frequencies (<200 Hz) and high frequencies (>4000 Hz). Moreover, the human voices are amplified (30~40 dB) to produce clear conversation. This greatly enhances the conversation quality, and avoid problems with unclear signals for sports Bluetooth earphones in the prior art. FIG. 6 shows the working principles of filtering out noises, where VM=loud user's voice+environmental noises and VS=small user's voice+environmental noises.

$$V_{out}=(VM-VS)*30\sim40\text{ dB}$$

$$=\{(\text{loud user's voice}+\text{environmental noises})-(\text{small user's voice}+\text{environmental noises})\}*30\sim40\text{ dB}$$

$$=\text{small user's voice}*30\sim40\text{ dB}$$

$$V_{BPF}=30\sim40\text{ dB}*\text{small user's voice}$$

$$=30\sim40\text{ dB}*\text{small user's voice}-\text{frequencies below 200 Hz}-\text{frequencies above 4000 Hz}$$

$$=\text{Hi-Fi user's voice}$$

Figure 7:
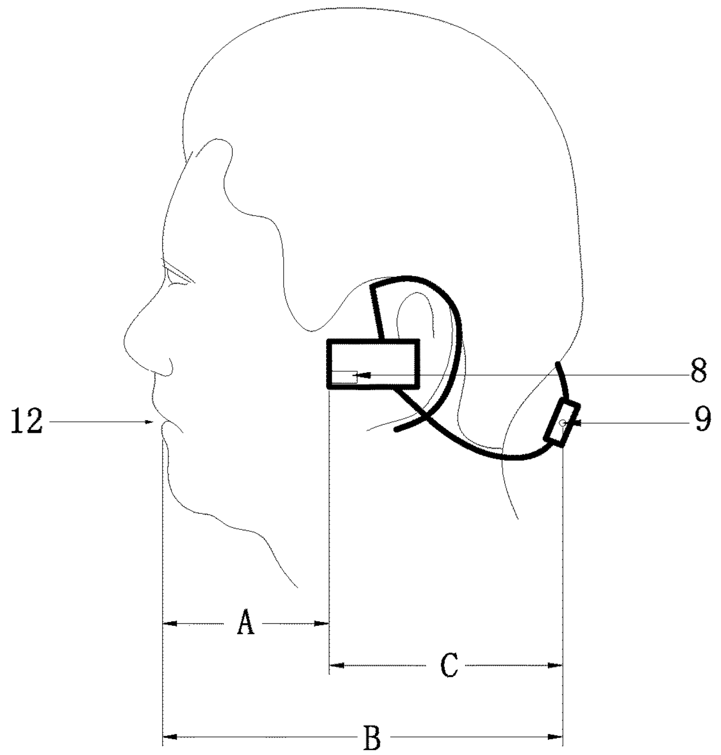
FIG. 7 shows the signal difference between the main microphone and the auxiliary microphone according to the invention.

The signal difference between the main microphone 8 and the auxiliary microphone 9 affects the clearness of conversation quality. The technique of maximizing the signal difference between the main microphone 8 and the auxiliary microphone 9 depends on the difference in the distance between the main microphone 8 and the user's voice source 12 and the distance between the auxiliary microphone 9 and the user's voice source 12. FIG. 7 shows the signal difference between the main microphone 8 and the auxiliary microphone 9.

Distance A=the distance between the user's voice source 12 and the main microphone 8. Distance B=the distance between the user's voice source 12 and the auxiliary microphone 9. The distance for the differential amplifier of the two microphones to obtain the optimized signal difference is given by

|Distance $A$−Distance $B$|>=Difference $C$ between distances from the main and auxiliary microphone to the user's voice source(>=7 cm).

The distance difference C in FIG. 7 is about 10 cm, greater than 7 cm. For a 85 dB voice source 12, the sound pressure difference between the main microphone 8 and the auxiliary microphone 9 is about 7~8 dB.

After pairing, the user can follow a software procedure provided by the MCU to set related parameters, such as touch-control sensitivity, effective touch-control time, invalid touch-control time, sleep time, deep sleep time, abnormal time, and other operation modes.

For example, in the music playing mode, one short press means to play or pause. Two short presses mean to play the next song. Three short presses mean to play the previous song.

In the incoming call mode, one short press means to receive the incoming call and a long press over one second means to reject the call.

In the conversation mode, one short press means to hang up.

Figure 8:
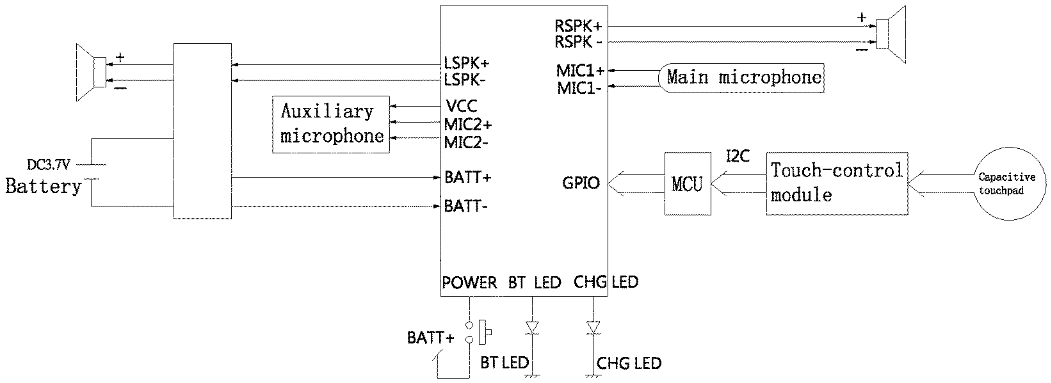
FIG. 8 is a circuit diagram of the invention.

As shown in FIG. 8, when the user touches, the metal plates 102 detect a minute charge change on the human body. Such a minute charge change is input to the touch-control IC module and converted into I2C data that is sent to MCU. The I2C data is tested and converted into GPIO data and sent to the touch-control IC module for the corresponding control, such as playing, pausing, playing the next song, and playing the previous song. The invention can implement various functions through simple and convenient operations.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

What is claimed is:

1. A sports Hi-Fi touch-control Bluetooth earphone, comprising a neckband, a first case and a second case connected to both ends of the neckband, an earplug set for each of the first and second cases, a Bluetooth main circuit board, a battery, a main microphone, an auxiliary microphone, and a capacitive touchpad, wherein the auxiliary microphone is disposed at the central position of the neckband via a fixing case, the battery is disposed inside the first case, the inner surface of the front wall of the second case is recessed so that the thickness of the front wall becomes thinner and forms a touch part, the capacitive touchpad is disposed on the touch part, the Bluetooth main circuit board is disposed inside the second case, the main microphone is disposed on the Bluetooth main circuit board, the Bluetooth main circuit board is connected to the main microphone, the auxiliary microphone, the capacitive touchpad and the battery, the first case includes a first front cover and a corresponding first rear cover provided with a first hook, the first front cover is formed with a first engaging slot corresponding to the first hook, a side position of the first rear cover is provided with an ear hook, the other side position thereof is provided with a first arc hole and a first positioning circular hole, the earplug set includes an ear cavity case, a speaker disposed inside the ear cavity case and a silicon earplug disposed on a sidewall of the ear cavity case, the other sidewall of the ear cavity case is provided with a first pin corresponding to the first arc hole and a first positioning pole corresponding to the first positioning circular hole.

2. The sports Hi-Fi touch-control Bluetooth earphone of claim 1, wherein the capacitive touchpad includes a touch-control substrate and a plurality of metal plates evenly spaced at the central position of the touch-control substrate, and the periphery of the touch-control substrate is provided with a ground plate extended along the profile line thereof.

3. The sports Hi-Fi touch-control Bluetooth earphone of claim 2, wherein the touch-control substrate has a circular profile, each of the metal plates has a sector profile, and the four metal plates are disposed on the touch-control substrate in a symmetric way with respect to the center.

4. The sports Hi-Fi touch-control Bluetooth earphone of claim 1, wherein the thickness of the touch part is smaller than or equal to 0.5 mm.

5. The sports Hi-Fi touch-control Bluetooth earphone of claim 1, wherein the main microphone is a MEMS microphone.

6. The sports Hi-Fi touch-control Bluetooth earphone of claim 1, wherein the auxiliary microphone is a MEMS microphone.

7. The sports Hi-Fi touch-control Bluetooth earphone of claim 1, wherein the second case includes a second front cover and a corresponding second rear cover provided with a second hook; the second front cover is formed with a second engaging slot corresponding to the second hook; a side position of the second rear cover is provided with an ear hook, and the other side position thereof is provided with a second arc hole and a second positioning circular hole; the earplug set includes an ear cavity case, a speaker disposed inside the ear cavity case, and a silicon earplug disposed on a sidewall of the ear cavity case; the other sidewall of the ear cavity case is provided with a second pin corresponding to the second arc hole and a second positioning pole corresponding to the second positioning circular hole.

* * * * *